(12) United States Patent
Katano et al.

(10) Patent No.: US 10,892,508 B2
(45) Date of Patent: Jan. 12, 2021

(54) FUEL CELL UNIT

(71) Applicant: TOYOTA JIDOSHA KABUSHIKI KAISHA, Toyota (JP)

(72) Inventors: Koji Katano, Toyota (JP); Hiroyuki Sekine, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 15/437,906

(22) Filed: Feb. 21, 2017

(65) Prior Publication Data

US 2017/0250435 A1 Aug. 31, 2017

(30) Foreign Application Priority Data

Feb. 26, 2016 (JP) ................................. 2016-035238

(51) Int. Cl.
*H01M 8/2475* (2016.01)
*H01M 8/249* (2016.01)
*H01M 8/2457* (2016.01)

(52) U.S. Cl.
CPC ......... *H01M 8/2475* (2013.01); *H01M 8/249* (2013.01); *H01M 8/2457* (2016.02); *H01M 2250/20* (2013.01)

(58) Field of Classification Search
CPC .............................. H01M 8/2475; H01M 8/249
USPC ........................................................ 429/452
See application file for complete search history.

(56) References Cited

U.S. PATENT DOCUMENTS

| 2007/0178345 A1* | 8/2007 | Takeda | H01M 8/04888 429/430 |
| 2011/0143239 A1* | 6/2011 | Ogawa | H01M 8/2465 429/423 |
| 2011/0159391 A1* | 6/2011 | Saito | H01M 8/2475 429/430 |
| 2013/0029237 A1* | 1/2013 | Fujisawa | H01M 8/2457 429/423 |

FOREIGN PATENT DOCUMENTS

| JP | 53-081355 U | 12/1951 |
| JP | H09181464 A | 7/1997 |
| JP | 2007-128752 A | 5/2007 |
| JP | 2011-192400 A | 9/2011 |
| JP | 2014-86171 | 5/2014 |

* cited by examiner

*Primary Examiner* — Jonathan G Jelsma
(74) *Attorney, Agent, or Firm* — Finnegan, Henderson, Farabow, Garrett & Dunner, LLP

(57) ABSTRACT

A fuel cell unit includes a fuel cell stack having a stacked plurality of single cells; a stack case housing the fuel cell stack; a component case having an opening dosed by a wall of the stack case that is parallel to a stacking direction of the single cells; and a high-voltage component which is housed inside the component case and fixed to at least one of an opposite wall and an extending wall of the component case, on a surface of that wall facing the inside of the component case, and to which electricity generated in the fuel cell stack is supplied. The opposite wall faces the opening. The extending wall extends from the opposite wall toward the stack case.

6 Claims, 4 Drawing Sheets

REFERENCE EXAMPLE 1

REFERENCE EXAMPLE 2

FUEL CELL UNIT

INCORPORATION BY REFERENCE

The disclosure of Japanese Patent Application No. 2016-035238 filed on Feb. 26, 2016 including the specification, drawings and abstract is incorporated herein by reference in its entirety.

BACKGROUND

1. Technical Field

The present disclosure relates to a fuel cell unit.

2. Description of Related Art

Some fuel cell units include a stack case housing a fuel cell stack having a stacked plurality of single cells, and a component case housing a high-voltage component to which electricity generated by the feel cell stack is supplied.

SUMMARY

The fuel cell unit of Japanese Patent Application Publication No. 2014-086171 has a component case disposed on the upper side of a stack case in the direction of gravity. To integrate the stack case and the component case in such a fuel cell unit, it is conceivable to make an opening in the component case and close this opening with a wall of the stack case in view of reducing the weight and the size of the fuel cell unit. However, where to dispose the high-voltage component in that case has been hitherto not given due consideration.

An aspect of the present disclosure relates to a fuel cell unit comprising: a fuel cell stack having a stacked plurality of single cells; a stack case housing the fuel cell stack; a component case having an opening closed by a wall of the stack case that is parallel to a stacking direction of the single cells; and a high-voltage component which is housed inside the component case and fixed to at least one of an opposite wall and an extending wall of the component case, on a surface of that wall facing the inside of the component case, and to which electricity generated in the fuel cell stack is supplied. The opposite wall faces the opening. The extending wall extends from the opposite wall toward the stack case. Compared with a configuration in which the high-voltage component is fixed on the outer side of the wall of the walls of the stack case that is parallel to the stacking direction of the single cells, this configuration can prevent the high-voltage component from being affected by expansion and contraction of the fuel cell stack occurring as the fuel cell stack generates electricity. That is, when the fuel cell stack generates electricity, the fuel cell stack expands and contracts in the stacking direction as the single cells expand and contract in the stacking direction. This expansion and contraction of the fuel cell stack in the stacking direction in turn causes expansion and contraction of the stack case in the stacking direction. This may adversely affect the fixation of any high-voltage component that is fixed on the outer side of the wall of the walls of the stack case that is parallel to the stacking direction of the single cells. According to the above aspect of the present disclosure, this adverse effect of expansion and contraction of the fuel cell stack upon the high-voltage component can be prevented. Thus, loosening of the fixation of the high-voltage component can be prevented compared with in the configuration in which the high-voltage component is fixed on the outer side of the wall of the walls of the stack case that is parallel to the stacking direction of the single cells.

The high-voltage component may be fixed to the opposite wall of the walls of the component case. Compared with a configuration in which the high-voltage component is fixed to a wall of the walls of the component case other than the opposite wall, this configuration can further prevent the high-voltage component from being affected by expansion and contraction of the fuel cell stack occurring as the fuel cell stack generates electricity. The walls of the walls of the component case other than the opposite wall are directly connected to the stack case, whereas the opposite wall is not directly connected to the stack case. Accordingly, the high-voltage component fixed to the opposite wall is less likely to be affected by expansion and contraction of the fuel cell stack occurring as the fuel cell stack generates electricity.

The component case may house a plurality of the high-voltage components, and the plurality of high-voltage components may be fixed to the opposite wall of the walls of the component case, at positions side by side along the opposite wall. Compared with a configuration in which the high-voltage components are placed one on top of another in a direction orthogonal to the opposite wall, this configuration can reduce the length of the fuel cell unit in the direction orthogonal to the opposite wall of the component case. Moreover, the convenience of maintenance work on the high-voltage components is improved compared with when the high-voltage components are placed one on top of another in the direction orthogonal to the opposite wall.

The present disclosure is also applicable in various configurations, for example, in the configuration of a fuel cell unit installed in a ship etc. powered by electricity, or of a household fuel cell unit. It goes without saying that the present disclosure is in no way limited to the above configurations but can be implemented in various other configurations within the gist of the disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiments

Figure 1:
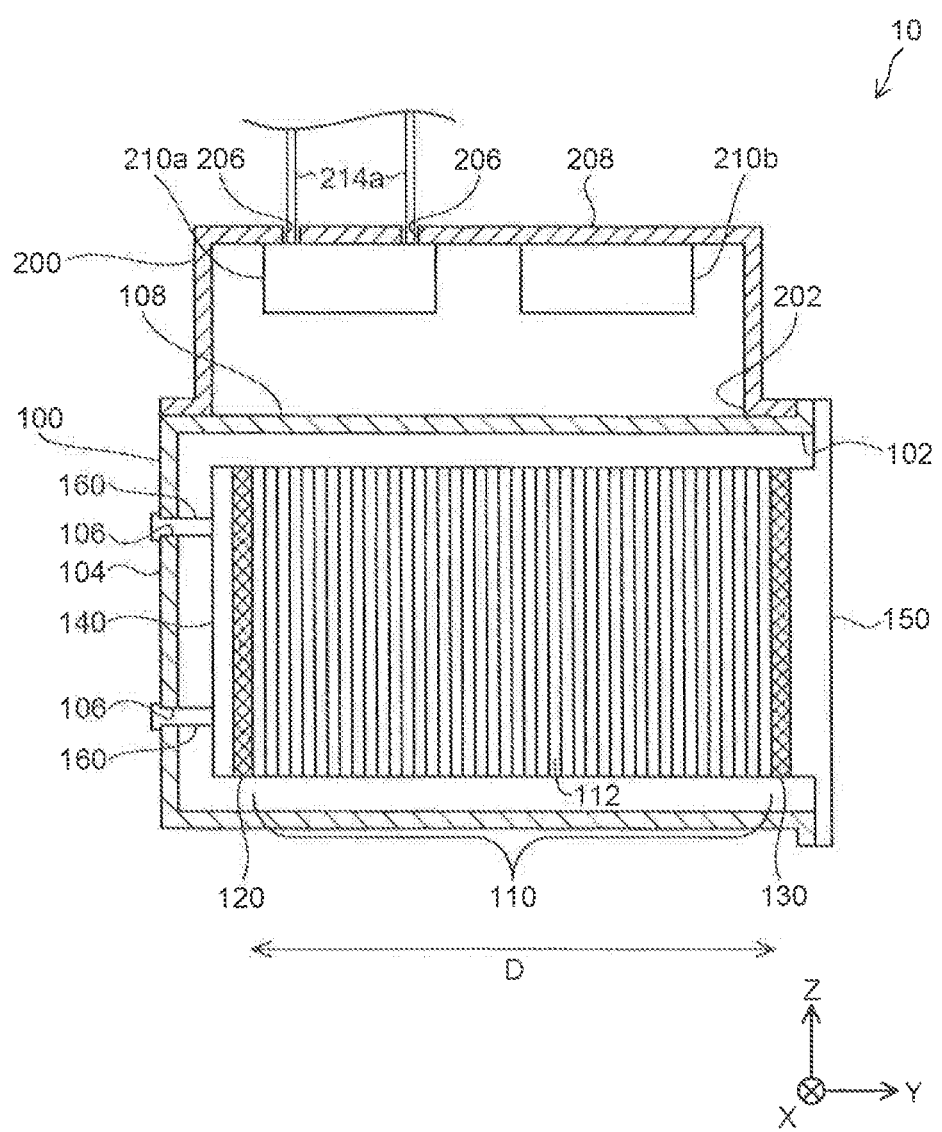
FIG. 1 is a view illustrating a fuel cell unit in an embodiment of the present disclosure.

FIG. 1 is a view illustrating a fuel cell unit 10 in an embodiment of the present disclosure. In FIG. 1, X-, Y-, and Z-axes orthogonal to one another are shown. The X-, Y-, and Z-axes of FIG. 1 correspond to the X-, Y-, and Z-axes of the other drawings. The fuel cell unit 10 is installed as a power source for a vehicle driven by a motor. The fuel cell unit 10 includes a stack case 100, a fuel cell stack 110, a first current collector 120, a second current collector 130, a pressure plate 140 an end plate 150, load adjustment screws 160, a component case 200, a high-voltage component 210a, and a high-voltage component 210b. The outline of the fuel cell unit 10 is formed by the outline of the stack case 100 and the component case 200 integrated with the latter mounted on the former.

The stack case 100 is disposed on the negative side in the Z-axis direction relative to the component case 200. The stack case 100 is a box-shaped member having an opening 102 on the positive side in the Y-axis direction. In this embodiment, the stack case 100 is a rectangular parallelepiped. Of walls forming the stack case 100, a wall 104 located on the negative side in the Y-axis direction is provided with two through-holes 106. The fuel cell stack 110 is housed inside the stack case 100.

The fuel cell stack 110 has a plurality of single cells 112 that generate electricity through electrochemical reactions of reactant gases. The single cells 112 are fastened together under a compressive load in a state of being stacked in a stacking direction D. In this embodiment, the stacking direction D of the single cells 112 is the Y-axis direction. In this embodiment, the fuel cell stack 110 is supplied with a hydrogen gas and air and generates electricity through electrochemical reactions between hydrogen and oxygen.

The first current collector 120 is disposed adjacent to an end wall of the fuel cell stack 110 located on the negative side in the Y-axis direction. The second current collector 130 is disposed adjacent to an end wall of the fuel cell stack 110 located on the positive side in the Y-axis direction. The first current collector 120 and the second current collector 130 collect electricity generated by the fuel cell stack 110.

In this embodiment, the first current collector 120 and the second current collector 130 are composed mainly of aluminum. In other embodiments, the first current collector 120 and the second current collector 130 may be composed of copper.

The pressure plate 140 is disposed adjacent to the first current collector 120 from the negative side in the Y-axis direction. The end plate 150 is disposed adjacent to the second current collector 130 from the positive side in the Y-axis direction. The end plate 150 is disposed at a position so as to cover the opening 102 of the stack case 100. The pressure plate 140 and the end plate 150 are members that pressurize the fuel cell stack 110 from both ends in the Y-axis direction.

In this embodiment, the pressure plate 140 and the end plate 150 are composed mainly of aluminum and resin. In other embodiments, the pressure plate 140 and the end plate 150 may be formed by various metal members having corrosion resistance and rigidity or by members combining metal and resin.

The load adjustment screws 160 are inserted into the through-holes 106 of the stack case 100 toward the positive side in the Y-axis direction, and press the pressure plate 140 toward the positive side in the Y-axis direction. Thus, as the load adjustment screws 160 press the fuel cell stack 110, the pressure plate 140 and the end plate 150 apply a compressive load to the fuel cell stack 110. Through the pressure plate 140 and the end plate 150, the stack case 100 is subjected to a force reacting to the compressive load on the fuel cell stack 110. Adjusting the length of leading end parts of the load adjustment screws 160 protruding inside the stack case 100 can adjust the force with which the pressure plate 140 is pressed.

The fuel cell stack 110 may expand and contract as the fuel cell stack 110 generates electricity. Specifically, when the fuel cell stack 110 generates electricity, the fuel cell stack 110 expands and contracts in the stacking direction D as the single cells 112 expand and contract in the stacking direction D. The stack case 100, which is subjected to a force reacting to the compressive load on the fuel cell stack 110 through the pressure plate 140 and the end plate 150, may also expand and contract in the stacking direction D as a result of any expansion and contraction of the fuel cell stack 110.

The component case 200 is disposed on the positive side in the Z-axis direction relative to the stack case 100. The component case 200 is a box-shaped member having an opening 202 on the negative side in the Z-axis direction. In this embodiment, the component case 200 is a rectangular parallelepiped. The opening 202 is disposed so as to be closed by a wall 108 of walls forming the stack case 100 that is located on the positive side in the Z-axis direction (by a surface of the wall 108 corresponding to the outer surface of the stack case 100). The wall 108 is a wall parallel to the stacking direction D of the single cells 112. Being parallel here means not only being exactly parallel to the stacking direction D but also being roughly parallel thereto.

A wall 208 of the walls forming the component case 200 that is located on the positive side in the Z-axis direction is provided with two through-holes 206. The through-holes 206 are through-holes through which conducting wires 214a that connect the high-voltage component 210a housed inside the component case 200 to another component are drawn out.

The high-voltage component 210a and the high-voltage component 210b are fixed to a surface, corresponding to the inner surface of the component case 200, of the wall 208 of the component case 200 located on the positive side in the Z-axis direction. In the present disclosure, "being fixed to a wall" means not only being directly fixed to a wall but also being indirectly fixed to a wall through another component. In this embodiment, the high-voltage component 210a and the high-voltage component 210b are directly fixed to the surface of the wall 208 corresponding to the inner surface of the component case 200.

The high-voltage component 210a and the high-voltage component 210b are fixed at positions side by side along the wall 208 (the inner surface of the component case 200). The high-voltage component 210a and the high-voltage component 210b are supplied with electricity generated by the fuel cell stack 110. In this embodiment, the high-voltage component 210a is a converter that adjusts electricity supplied from the fuel cell stack 110. In this embodiment, the high-voltage component 210b is a service plug that can interrupt electrical connection in a circuit including the fuel cell stack 110. In the following description, reference sign "210" will be used to collectively refer to the two high-voltage components.

Compared with a configuration in which the high-voltage components 210 are placed and fixed one on top of the other in the Z-axis direction, this configuration in which the high-voltage components 210 are fixed at positions side by side along the wall 208 can reduce the length of the fuel cell unit 10 in the Z-axis direction. Moreover, compared with the configuration in which the high-voltage components 210 are placed one on top of the other in the Z-axis direction, this configuration can improve the convenience of maintenance work on the high-voltage components 210. For example, a worker can easily touch each of the high-voltage components 210 during maintenance work on the high-voltage components 210.

Thus, compared with a configuration in which the high-voltage components are fixed to a wall (e.g., the wall 108) forming the stack case 100, i.e., to the outer surface of the stack case 100, the embodiment described above can prevent the high-voltage components 210 from being affected by expansion and contraction of the fuel cell stack 110 occurring as the fuel cell stack 110 generates electricity. Accordingly, this embodiment can prevent loosening of the fixation of the high-voltage components 210 compared with, for example, the configuration in which the high-voltage components 210 are fixed to the wall 108 forming the stack case 100. That is, when the fuel cell stack 110 generates electricity, the fuel cell stack 110 expands and contracts in the stacking direction D as the single cells 112 expand and contract in the stacking direction D. This expansion and contraction of the fuel cell stack 110 in the stacking direction D in turn causes expansion and contraction of the stack case 100 in the stacking direction D. This may adversely affect the fixation of any high-voltage component that is fixed to the wall 108 of the walls forming the stack case 100 that is parallel to the stacking direction of the single cells. According to the embodiment described above, this adverse effect of expansion and contraction of the fuel cell stack 110 upon the high-voltage components 210 can be prevented.

To replace the fuel cell stack 110 with another fuel cell stack (a new fuel cell stack 110), the component case 200 can be removed along with the high-voltage components 210. Thus, simply mounting the component case 200 on the stack case 100 housing the new fuel cell stack 110 can reinstall the high-voltage components 210. This means saving of the time required for removing the high-voltage components 210 from the stack case 100 compared with in the configuration in which the high-voltage components 210 are fixed to the wall 108 forming the stack case 100. Accordingly, the efficiency of the work of replacing the fuel cell stack 110 can be increased.

In the first embodiment, the high-voltage components 210 are fixed to the wall 208. Thus, compared with the configuration in which the high-voltage components 210 are fixed to a wall of the walls forming the component case 200 other than the wall 208, this embodiment can further prevent the high-voltage components 210 from being affected by expansion and contraction of the fuel cell stack 110 occurring as the fuel cell stack 110 generates electricity. The walls of the walls forming the component case 200 other than the wall 208 are directly connected to the stack case 100, whereas the wall 208 is not directly connected to the stack case 100. According to the configuration of the first embodiment, therefore, the high-voltage components 210 are less likely to be affected by expansion and contraction of the fuel cell stack 110 occurring as the fuel cell stack 110 generates electricity.

B. Reference Example 1

Figure 2:
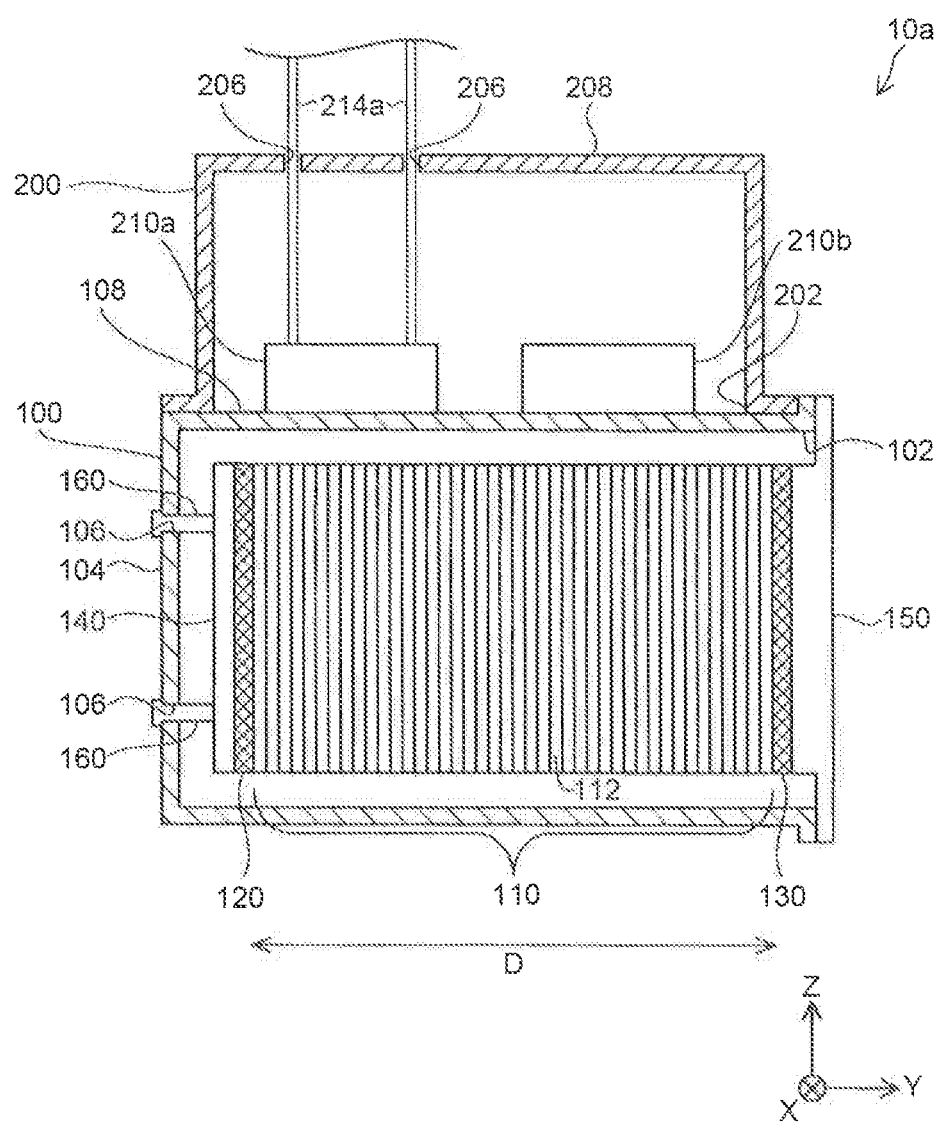
FIG. 2 is a view illustrating a fuel cell unit in Reference example 1.

FIG. 2 is a view illustrating a fuel cell unit 10a in Reference example 1. The fuel cell unit 10a is the same as the fuel cell unit 10 except that the high-voltage component 210a and the high-voltage component 210b are fixed on the positive side in the Z-axis direction of the wall 108.

In Reference example 1, the high-voltage component 210a and the high-voltage component 210b are fixed on the positive side in the Z-axis direction of the wall 108. When the fuel cell stack 110 generates electricity, the fuel cell stack 110 may expand and contract in the stacking direction D as the single cells 112 expand and contract in the stacking direction D. The high-voltage components 210 may be affected by expansion and contraction of the stack case 100 in the stacking direction D resulting from this expansion and contraction of the fuel cell stack 110. For example, the fixation of the high-voltage components 210 may loosen due to expansion and contraction of the fuel cell stack 110 occurring as the fuel cell stack 110 generates electricity. This makes it necessary to increase the axial force of bolts fixing the high-voltage components 210, which would lead to an increase in mass of the fuel cell unit.

In the first embodiment, by contrast, the high-voltage components 210 are fixed on the inner side of the wall 208 of the component case 200 located on the positive side in the Z-axis direction (see FIG. 1), so that the high-voltage components 210 can be prevented from being affected by expansion and contraction of the fuel cell stack 110 occurring as the fuel cell stack 110 generates electricity.

In Reference example 1, the high-voltage component 210a is fixed on the positive side in the Z-axis direction of the wall 108. Thus, when mounting the component case 200 on the stack case 100 during the manufacturing process of the fuel cell unit 10a, it is necessary to mount the component case 200 on the stack case 100 while passing the conducting wires 214a through the through-holes 206 of the component case 200.

According to the first embodiment, by contrast, when mounting the component case 200 on the stack case 100, one can mount the component case 200 on the stack case 100 with the conducting wires 214a already passed through the through-holes 206 of the component case 200. This can avoid complication of the work of drawing out the conducting wires 214a from the inside to the outside of the component case 200 when mounting the component case 200 on the stack case 100.

C. Reference Example 2

Figure 3:
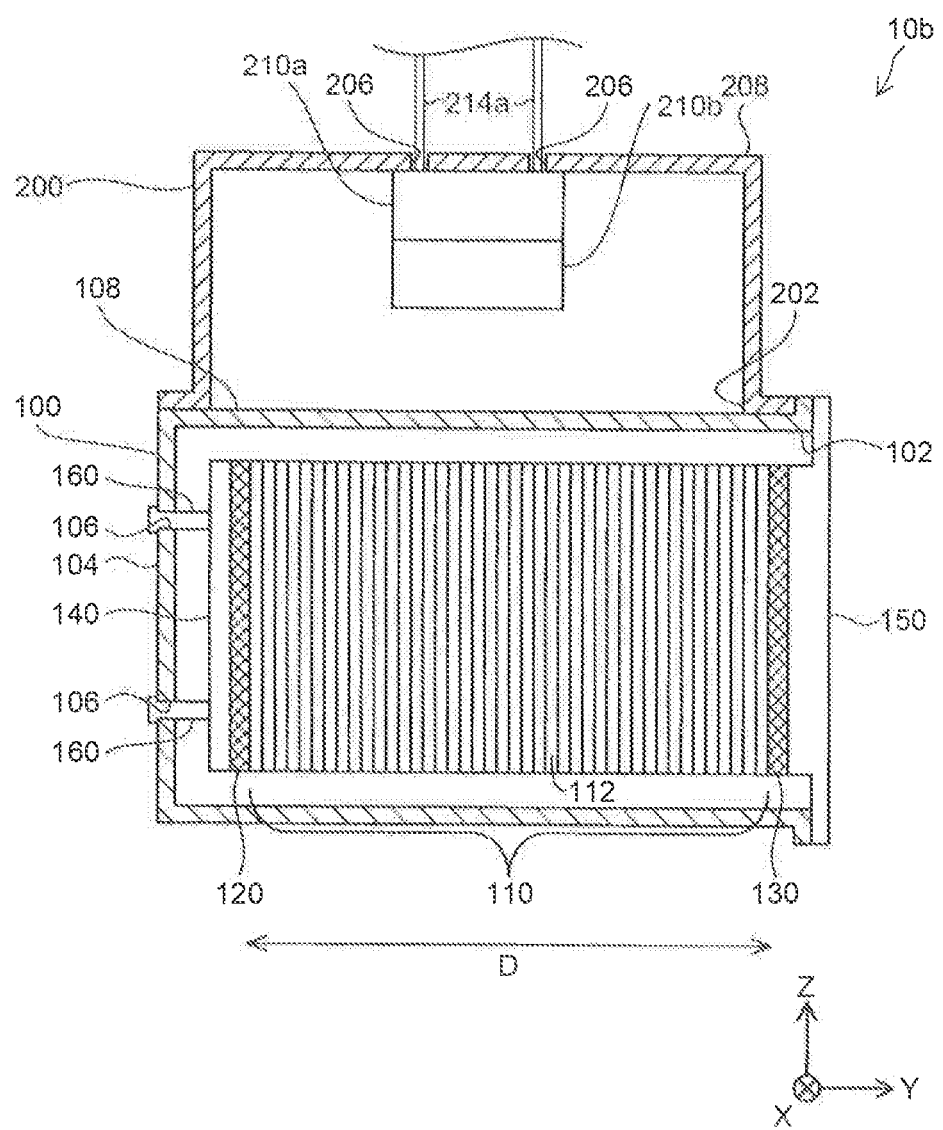
FIG. 3 is a view illustrating a fuel cell unit in Reference example 2.

FIG. 3 is a view illustrating a fuel cell unit 10b in Reference example 2. The fuel cell unit 10b is the same as the fuel cell unit 10 except that the high-voltage component 210b is placed and fixed on the negative side in the Z-axis direction of the high-voltage component 210a that is fixed to the wall 208.

In Reference example 2, the high-voltage component 210a and the high-voltage component 210b are placed and fixed with one on top of the other in the Z-axis direction, so that the fuel cell unit 10 tends to be longer in the Z-axis direction. Moreover, compared with the first embodiment, this configuration with the high-voltage component 210a and the high-voltage component 210b placed and fixed one on top of the other in the Z-axis direction complicates the maintenance work on the high-voltage components 210. For example, to work on a part of the high-voltage component 210b that is in contact with the high-voltage component 210a, a worker has to remove the high-voltage component 210a from the high-voltage component 210b.

In the first embodiment, by contrast, the high-voltage components 210 are fixed at positions side by side along the wall 208, and thus the length of the fuel cell unit 10 in the Z-axis direction can be reduced. Moreover, the high-voltage components 210 are easy to touch, which is highly convenient for the maintenance work on the high-voltage components 210.

D. Modified Examples

In the first embodiment, the high-voltage component 210a and the high-voltage component 210b are fixed at positions side by side along the wall 208, but the present disclosure is not limited to this example. For example, the high-voltage component 210a and the high-voltage component 210b may be fixed to different walls of the walls forming the component case 200, namely the walls of the component case 200 located on the positive and negative sides in the Y-axis direction and the walls of the component case 200 located on the positive and negative sides in the X-axis direction. However, it is preferable that the high-voltage component 210a and the high-voltage component 210b be fixed to the walls of the component case 200 located on the positive and negative sides in the Y-axis direction in view of the high-voltage components 210 being less likely to be affected by expansion and contraction of the fuel cell stack 110 occurring as the fuel cell stack 110 generates electricity.

In the first embodiment, the stack case 100 and the component case 200 are rectangular parallelepipeds, but the present disclosure is not limited to this example. For example, the stack case 100 and the component case 200 may be members that are not rectangular parallelepipeds but have a shape of a container with a curved wall.

In the first embodiment, the component case 200 has the opening 202 on the negative side in the Z-axis direction, but the present disclosure is not limited to this example. For example, the component case 200 may also have a wall on the negative side in the Z-axis direction, and may have an opening 202 formed by opening a part of that wall.

Figure 4:
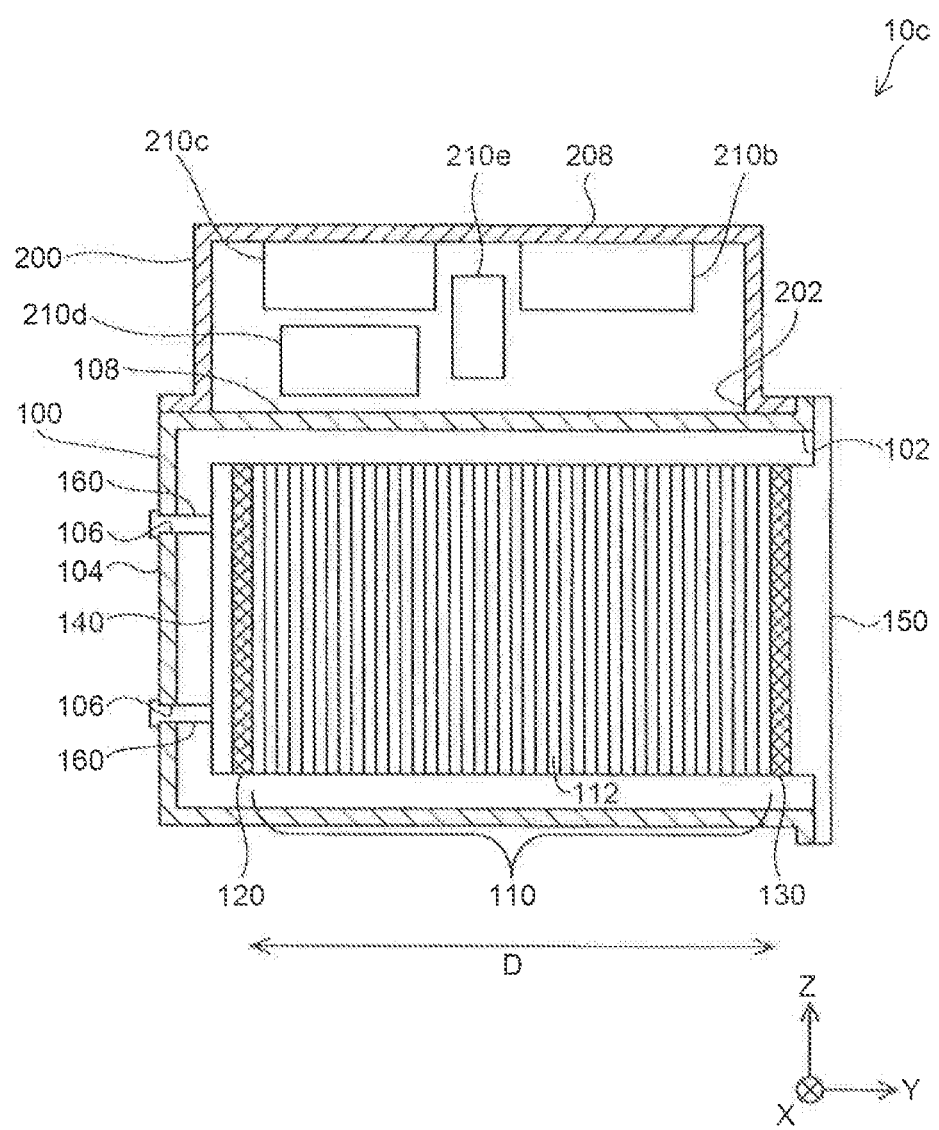
FIG. 4 is a view illustrating a fuel cell unit in a modified example.

FIG. 4 is a view illustrating a fuel cell unit 10c in a modified example. In the first embodiment, the converter as the high-voltage component 210a and the service plug as the high-voltage component 210b are housed inside the component case 200, but the present disclosure is not limited to this example. For example, a pump inverter as a high-voltage component 210c, a reactor as a high-voltage component 210d, a relay as a high-voltage component 210e, etc. may be housed inside the component case 200. In the fuel cell unit 10c shown in FIG. 4, the high-voltage component 210b and the high-voltage component 210c are directly fixed to the wall 208 of the walls forming the component case 200 that faces the inside, while the high-voltage component 210d and the high-voltage component 210e are indirectly fixed to a wall of the walls forming the component case 200 other than the wall 208 (fixed on the inner surface of the component case 200) through another component (not shown). In the present disclosure, "being fixed to a wall" means not only being directly fixed to a wall but also being indirectly fixed to a wall through another component.

In the first embodiment, the high-voltage component 210a and the high-voltage component 210b are directly fixed to the wall 208, but the present disclosure is not limited to this example. For example, the high-voltage component 210a and the high-voltage component 210b may be indirectly fixed to the wall 208 through another component, or may be directly or indirectly fixed to a wall of the walls forming the component case 200 other than the wall 208. However, it is preferable that the high-voltage component 210a and the high-voltage component 210b be fixed to the wall 208.

The present disclosure is not limited to the above embodiment, examples, and modified examples but can be realized in various other configurations within the gist of the disclosure. For example, the technical characteristics described in the embodiment, examples, and modified examples corresponding to the technical characteristics of the forms described in the summary can be appropriately substituted or combined to solve part or all of the problems or to achieve part orally the effects of the disclosure. Unless these technical characteristics are described as essential in this specification, such characteristics can be omitted as appropriate.

What is claimed is:

1. A fuel cell unit comprising:
a fuel cell stack having a stacked plurality of single cells;
a stack case housing the fuel cell stack;
a component case having an opening abutting an outer surface portion of the stack case that is parallel to a stacking direction of the single cells, and being removably mounted on the outer surface portion of the stack case along a periphery of the opening; and
a high-voltage component which is housed inside the component case and fixed to an opposite wall of a plurality of walls of the component case so as to form a space between the outer surface portion of the stack case and the high-voltage component, on a surface of the opposite wall facing the inside of the component case, and to which electricity generated in the fuel cell stack is supplied, the opposite wall facing the opening,
wherein a portion of the component case that defines the opening connects to the outer surface portion of the stack case in a state where the opening faces the stack case, and
wherein fixing of the high-voltage component on the surface of the opposite wall facing the inside of the component case is configured to prevent the high-voltage component from being affected by expansion and contraction of the fuel cell stack as the fuel cell stack generates electricity.

2. The fuel cell unit according to claim 1, wherein
the component case houses a plurality of the high-voltage components, and
the plurality of high-voltage components are fixed to the opposite wall of the walls of the component case, at positions side by side along the opposite wall.

3. The fuel cell unit according to claim 1, wherein one end of the fuel cell stack and the other end of fuel cell stack are fixed to the stack case.

4. The fuel cell unit according to claim 1, wherein an entirety of the component case is removable from the stack case.

5. The fuel cell unit according to claim 1, wherein:
the component case further comprises a through-hole, and
the fuel cell unit further comprises a conducting wire connecting the high-voltage component to another component, the conducting wire passing through the through-hole.

6. The fuel cell unit according to claim 1, wherein the opposite wall of the component case comprises a through-hole.

* * * * *